United States Patent [19]
Svetkoff et al.

[11] Patent Number: 5,546,189
[45] Date of Patent: Aug. 13, 1996

[54] TRIANGULATION-BASED 3D IMAGING AND PROCESSING METHOD AND SYSTEM

[75] Inventors: Ronald J. Svetkoff, Ann Arbor; Donald K. Rohrer, Whitmore Lake; Robert W. Kelley, Ann Arbor, all of Mich.

[73] Assignee: View Engineering, Inc., Simi Valley, Calif.

[21] Appl. No.: 245,864

[22] Filed: May 19, 1994

[51] Int. Cl.$^6$ ........................................ G01B 11/24
[52] U.S. Cl. ............... 356/376; 250/559.23; 250/559.31
[58] Field of Search .................................. 356/375, 376; 250/559.22, 559.23, 559.29, 559.31

[56] References Cited

U.S. PATENT DOCUMENTS

| | | | |
|---|---|---|---|
| 4,373,804 | 2/1983 | Pryor et al. | 356/376 |
| 4,529,316 | 7/1985 | DiMatteo | 356/376 |
| 4,534,650 | 8/1985 | Clerget et al. | 356/376 |
| 4,553,844 | 11/1985 | Nakagawa et al. | |
| 4,634,879 | 1/1987 | Penney . | |
| 4,643,578 | 2/1987 | Stern . | |
| 4,731,853 | 3/1988 | Hata et al. | |
| 4,733,969 | 3/1988 | Case et al. | |
| 4,891,772 | 1/1990 | Case et al. | |
| 5,048,965 | 9/1991 | Amir | 356/376 |
| 5,118,192 | 6/1992 | Chen et al. | 356/376 |
| 5,200,799 | 4/1993 | Maruyama et al. | |

OTHER PUBLICATIONS

Paper entitled: "Video Rate Laser Scanner: Considerations on Triangulation Optics, Detectors and Processing Circuits", Kees S. Kooijman & Jef. L. Horijon, SPIE. Vol. 2065, pp. 251–263.

*Primary Examiner*—F. L. Evans
*Attorney, Agent, or Firm*—Brooks & Kushman P.C.

[57] ABSTRACT

A triangulation-based method and system for high speed 3D and gray scale imaging and associated pre-processing of digitized information allows for estimation or filtering of height and gray scale values based upon the confidence level of the information obtained from a pair of sensors and also based upon knowledge of the object structure and its reflectance characteristics. A modulated laser beam is scanned across the object to create a plurality of spots which are viewed by a pair of well-matched receivers. Each receiver includes a light collection and delivery system, a position sensitive detector, and an associated ratio-metric signal processor, or similar means for extraction of height and intensity information or data by triangulation. An optional automatic light control sub-system provides greatly extended dynamic range with control inputs derived from an amplifying detector included in each receiver to maximize occurrences of valid data points. Prior to image processing, each point in the digitized 3D and gray scale data is transformed based upon the digital values of the gray scale and height values. The multi-channel pointwise transformation produces an improved estimate of intensity and height at a point of interest, or is used to filter the data for improvements in the 3D and gray scale contrast prior to image processing and measurement analysis. Either linear or non-linear transformations are utilized, based on the match between 3D and gray values, and other conditions which determine the confidence level of the information.

33 Claims, 6 Drawing Sheets

$Z_{out} = f(Z_1, Z_2, IF(GS_1 > CONSTANT_1), IF(GS_2 > CONSTANT_2))$ $GS_{out} = f(GS_1, GS_2)$

5,546,189

TRIANGULATION-BASED 3D IMAGING AND PROCESSING METHOD AND SYSTEM

TECHNICAL FIELD

This invention relates to machine vision methods and systems and, in particular, to triangulation-based 3D imaging and processing methods and systems.

BACKGROUND ART 3D imaging techniques have been demonstrated ranging from con-focal microscopes to time-of-flight laser rangefinders, covering applications from microscopic integrated circuit measurements to large field-of-view applications like mobile robot navigation. Performance specifications for these sensors vary widely, with a figure of merit often determined based upon specific requirements.

Many applications impose simultaneous requirements of rapid inspection rates for 100% inspection of the entire object volume, yet accuracy and precision measured in microns or perhaps finer. Such requirements present challenges for sensor design, and necessary consideration of fundamental imaging limits. These limits require not only examination of the technical specifications of scanning and detection devices used for image formation, but close examination of the characteristics (reflection, transmission, size relative to sensor resolution) of the objects being examined. In a 3D system, the reproducibility of a measurement is often limited by sensor parameters (signal to noise, resolution, etc.) but the absolute accuracy is limited by the object structure and the influence of optical background (both spatial and temporal noise.

With increasing trends toward miniaturization, manufacturers of microelectronics assemblies and miniature parts often have requirements for very fine measurement or defect detection capability for automatic three-dimensional optical inspection equipment. 3D sensors which can potentially satisfy the measurement requirements include confocal microscopes, dynamic focus sensors, triangulation-based probes, and various interferometric devices. Cost effective solutions for process monitoring where specific regions of interest are monitored now exist, but are often limited in measurement speed.

For example, the requirements for 100% inspection of a 641 ×641 wafer (or other object) with a 2.5 μm×2.5 μm (which can be coarse for inspection of such devices) samples taken over the entire surface are extreme. A typical dynamic focus probe acquires about 1000 data points per second. The resulting inspection time for a 641 ×641 object is 1.3 months. Point triangulation sensors operate at about 10000 points per second and reduce the inspection time to a few days. 3D sensors which approach video rates, as described in U.S. Pat. No. 5,024,529 reduce the inspection time to minutes which is acceptable for many facilities.

Also, other applications for in-line 100% inspection may require a few seconds for 100% inspection of a 641 ×641 part with coarser resolution (say 25 μm×25 μm). In many applications, a tradeoff between speed and accuracy is not acceptable which restricts many present measurement tools to off-line inspection which greatly reduces the value added. Hence, accuracy and high speed, which are mutually conflicting parameters, are both required to maximize the return on investment of inspection equipment. Clearly, very rapid data rates must be achieved for 100% inspection.

A three dimensional imager which can meet accuracy requirements and speed requirements has a recognized need in at least the following areas:

Inspection of circuit boards and components: solder paste and components, lead and solder ball grid array coplanarity, package dimensions and lead to body standoff;

Microelectronics assemblies: multi-chip-modules, high density miniature bump grid arrays, TAB inner lead bond, wire bond;

Micromachined parts: miniature machines and mechanical assemblies;

Data storage industry: disk platter flatness, disk drive suspensions, defect detection;

General surface defect detection: ceramics, glass, metals, paper; and

Shape analysis and matching: forensic science including toolmarks, firearm ID, pattern matching, 3D texture analysis.

Of all known methods for 3D imaging, triangulation provides the most practical method for a high speed-accuracy product. Triangulation is the most effective method for applications where a relatively short working distance is acceptable and where off-axis viewing of three dimensional shape is tolerable (i.e. no narrow, deep holes).

FIG. 1 shows a sketch of a typical triangulation based sensor. An incident laser beam 10 strikes an object 12 at a first or a second height 14 and 16, respectively. A position sensitive detector or array sensor 18 is provided as well as a receiver optical system 20 for magnification. The instantaneous field of view of the sensor 18 is indicated at 22. Height and gray scale information are provided on lines 24 from a signal processor 26 to a computer 28 for image processing and analysis.

Although the triangulation method provides many advantages, it is not immune to certain types of errors, the most obvious of which are due to shadowing or occlusion as shown in FIG. 2. These problems are compensated for by the use of two or more sensors 30 and 31. An incident laser beam 32 strikes a step object 34 which has an occluded region 36 wherein sensor rays from the surface of the object are blocked from the sensor 30. However, this region 36 is visible to the sensor 31 as indicated at line 38. The IFOV of both sensors 30 and 31 is indicated at 39.

More detailed examination of potential defects shows other important errors arise from acceptance of scattered light and various sources of optical/electronic background noise within the instantaneous field of view (IFOV). In triangulation systems, unlike dynamic focus sensors, the IFOV along the triangulation sensing axis cannot be reduced to a single point, and the system designer must be prepared to deal with this limitation.

It is important to recognize that simple occlusion is a relatively easy problem to solve with just a pair of detectors, as shown in FIG. 2. Often a sum or average of recorded height values is used for an approximation, and if the shadow is perfect (no stray light leakage), the proper value will be recorded. Also, error contributions created by non-symmetric spot distributions resulting from surface roughness/marks in non-occluded or quasi-flat areas are significantly reduced by averaging the asymmetric spot distribution seen along the position sensing axis. This is a consequence of imaging from opposite viewpoints where if the peak of the asymmetric spot distribution appears high to detector #1, it will appear low to detector #2. The average (or midpoint for two detectors) is a good estimate of the spot center, and the error cancels or is greatly reduced.

However, examination of complex surfaces indicates that sensor processing techniques which only add or average multiple channels do not eliminate or even identify some of the most severe errors. In FIG. 3, an incident laser beam 40 penetrates translucent material of an object 42 and propagates outward becoming visible as background light to a first sensor 44 wherein the object 42 blocks light from a scattering center invisible to the first sensor 44. At a region 45 of the object 42, scattered light is visible to both detectors. The light is scattered from internal scattering centers 43. The average value no longer is a proper height measurement but is erroneously recorded as a very high peak when, in fact, the region is much lower. True surface position is indicated at 46 and a truncated (shadowed) spot distribution is indicated at 48. At a second sensor 50, the spot distribution is shown at 52. At region 47, scattered light is only visible to the second sensor 50. A ray from the scattering center seen by the sensor 50 is indicated at 49.

This severe error illustrated in FIG. 3 limits proper discrimination of the object and background on the basis of height, and even capability for "presence/absence" detection.

Similarly, FIG. 4 shows a case often found on circuit boards where a series of pads 54 are covered with solder paste or, on a finer scale, where leads are connected to the bonding pads in the inner lead bond region of a tab integrated circuit. FIG. 4 shows first and second laser light scans 51 and 53 and their associated first and second detectors 56 and 58, respectively. A line 60 indicates current detector position and spots on the detectors 56 and 58 represent actual detector position.

The pads 54 are in close proximity, and the slanted edges lead to multiple reflections from adjacent pads or secondary background illumination as indicated at line 62. Lines 64 indicate useful distance reflection from the point of interest. The sensor sees a secondary reflection from adjacent pad resulting in an erroneous high value, but the noise is occluded by the sensor 58, so the error cannot cancel with simple averaging. Hence, there is an artifact at the edge manifested as an incorrect high Z value.

Another important example is shown in FIG. 5. The object has a shiny surface finish and a curved geometric shape, the configuration which is most challenging for any 3D imaging system. A specific example is a single solder ball 66 which is an element of a ball grid array (BGA) consisting of hundreds or even thousands of solder locations per square inch. Dimensions of each solder ball can vary from about ten microns to about 0.5 mm. With a high density of small diameter features, inspection will only prove useful if the imaging and image analysis system are able to provide measurements indicating deviation of coplanarity (height) and ball diameter measurements at a very rapid rate of speed, perhaps several thousand per second. Examination of three representative scans across the object illustrate challenges in imaging and preprocessing.

Scan #1 (not shown in FIG. 5). When the scanning laser beam is near the peak of the solder ball, the gray scale and height values will be well matched and well within the dynamic range of the sensor, and the average height value is a good estimate and cancels some asymmetry in the spot distribution. The surface orientation is favorable for both sensors 68 and 70.

Scan #2. However, for a second scan for an incident laser beam 72 where the surface normal is such that sensor 68 is receiving direct specular reflection, a very high gray scale value will be recorded at the sensor 68. This signal can easily exceed the dynamic range of the system, even if high speed automatic light control (ALC) is used. If ALC is used to bring the sensor 68 into range (say, by reducing signal by one to two decades), sensor 70 may receive low light return resulting in a poor signal to noise ratio and an inaccurate estimate of the height. Although the sensor is brought into the intensity range, the local dynamic range is so large that optical crosstalk (smear and streak noise) may result in corruption of the height values in the region near the saturation point because signal may vary by about four decades in a local region.

Furthermore, if the ALC range is extreme, measurement speed may be compromised. If the range of ALC is insufficient and compression of the strong signal does not produce valid data for the sensor 68, then the sensor 70 will also be out of range. If direct laser diode modulation (only one decade range) is incorporated, this situation can easily occur. Hence, the strongest signal may not always be best.

Scan #3. A third scan down the side of the object shows a most difficult problem. The specular surface illuminates what may be a glossy background which, because of the angle of incidence and reflection, produces an intensity reading at the sensor 68 which is, perhaps, orders of magnitude stronger than the signal from the point of interest. In this case, both the height and intensity readings from the sensors 68 and 70 are much different and indicate a severe error condition and low confidence in the data.

These illustrations show that for scanning of a single solder ball, each sensor is required to operate throughout the entire dynamic range, and will encounter spurious data at many points. For measurement of grids, the luxury of re-orienting the sensor through rotation of articulation cannot be afforded if 100% inspection is to be accomplished at assembly line rates. Furthermore, for such a geometry, no favorable position for the sensor may exist which eliminates the error. Nevertheless, key information for the measurement task is still available, provided erroneous data points can be recognized or filtered. Many other examples can be found where simple averaging of height values (suggested in prior art) produces large measurement errors, particularly for complex shapes with smooth surface finish.

Errors associated with these phenomena have been quantified. A typical problematic case arises when inspecting solder paste and traces on printed circuit boards. The effect of occlusion and reflection artifacts is best illustrated by comparing results for long, thin objects which are measured, then rotated by 90 degrees, and measured again. Test results indicated variation in readings from about 30% to 50% depending upon the reflectance variation between the solder paste, background, and pads.

The error is noticeable when the occluded region as illustrated in FIG. 4 is along the length of the pad, corresponding to the position sensitive dimension. The artifacts not only are manifested in the computation, but are so large as to be visible to the eye. Such variation is unacceptable for in-line process control, and because of the visibility, barely acceptable for "presence/absence" (coarse inspection).

Many triangulation based probes are available and can be broadly classified as follows: point sensors, line of light systems, and laser scanners producing data rates of about 10K points per second, up to 100K points per second, and up to 10M points per second respectively. Regardless of the particular embodiment, it is well known among those skilled in triangulation based imaging that the use of various combinations of multiple transmitter and receiver devices can be used to improve performance through reduction of shadowing and occlusion related defects as illustrated in FIG. 4. Aside from the disadvantage of slow measurement speed, point sensors have been developed with 4 detector systems and 8 detector systems arranged symmetrically about the transmitted point of light. In 4 detector systems, the receivers are positioned at the sides square, and in a ring detector arrangement for 8 detector systems. There is obvious benefit to this approach, but upon consideration of inspection speed requirements, the method is not acceptable.

In an array camera system, the errors resulting from reflection phenomena shown in FIGS. 3–5 can sometimes be reduced by counting and suppressing multiple spots found along the position sensing axis, but only at the penalty of severely reduced measurement speed. Furthermore, the correct height value cannot be discerned simply by looking at the intensity of each spot, sometimes the erroneous value may have a larger intensity, as shown in FIG. 5.

Line of light systems offer substantial measurement speed advantages over mechanically scanned point detectors, but are limited by the camera readout rate to the 30K point per second range. Multiple lines of light, high speed framing cameras, or smaller arrays which can be read at faster frame rates offer some advantages. Nevertheless, accuracy will often be unacceptable in measurement applications (as opposed to height presence/absence) unless scene dependent errors are reduced. In laser line of light or line scan systems, the symmetry which allows for simple averaging of non-occluded detector pairs is absent, restricting the number of detectors to 2 devices, unless successive scans are utilized with rotation of the imaging head or part, or additional cameras and scan lines added for orthogonal viewing.

The U.S. Pat. No. to Clerget, 4,534,650, describes a 3D measurement device utilizing at least two distinct sensors (photodiode bars). Part of the purpose of the part is to correct output from "faulty photosensitive elements". As can be seen from the above discussion of reflections and occlusion, that is the least of the problems which can occur.

The U.S. Pat. Nos. to Case et al., 4,891,772 and 4,733,969, describe the use of a "plurality" of sensors for line and point measurements. Features include exposure control based upon spot size measurement so as to allow for use of nxn array or sensors and "low level" algorithms for estimation of the spot center from the intensity distribution obtained from readout of each CCD array. In the '969 patent it was stated in column 2 that a "user of the system may reject certain areas and eliminate erroneous readings caused by multiple reflections from complex geometries". This allows the user access to image for placing "windows".

In the '772 patent (also using multiple detecting elements), the exposure is controlled to balance power on detector.

The U.S. Pat. No. to Stern, 4,643,578, describes a system that uses a mask synchronized with the position of a light beam and readout location. This method is very effective for reduction of errors from stray light outside the FOV, and to mask high background optical noise as might be encountered in a welding application. However, the entire position sensing area cannot be masked effectively so that severe errors can still be present.

The U.S. Pat. Nos. to Penney et al., 4,634,879 and 4,645,917, describe a means of filtering optical noise similar to Stern, but the system employs photo-multiplier tubes for position detection rather than a CCD array. The descanning action performs the same function as shown by Stern. Only a single receiver is used and occlusion effects limit performance.

The U.S. Pat. No. to Nakawaga, 4,553,844, shows a scanning/descanning arrangement for inspecting solder. The direction orthogonal to the position sensing axis is blocked resulting in an IFOV which is a narrow strip, similar to the Penney and Stern disclosures. The position sensing axis is exposed and with the use of only a single detection device the system is limited by phenomena illustrated in FIGS. 4 and 5. The most severe errors are not compensated. Light which is blocked often has lower intensity than "highlights" found along PSD axis.

The U.S. Pat. No. to Amir, 5,048,965, describes a 3D imaging method using a CCD linear array and matched pairs of lights for occlusion avoidance. The method has potential for high speed acquisition (approaching video rates) and, with a 4096 linear array, simultaneous wide field coverage. With this method, two images, each with two matched light sources, are required for occlusion avoidance. Instead of using a position sensitive detector (PSD) for each receiver, the equivalent function is provided by a pair of encoded light patterns (illumination gradients of opposite sign) which are projected onto the surface and imaged onto the array, one illumination pattern for each single scan of the object. The height measurement obtained from a single illumination direction is computed with ratiometric processing (similar to PSD based systems) applied to the two encoded patterns (which are switched between passes). For occlusion avoidance, a prescribed relationship between the intensity values is used to compute depth as desired from the illumination spatial profiles. Examination of the resulting equation shows the relationship is equivalent to averaging the centroid estimates obtained from the two illumination directions.

The U.S. Pat. No. to Chen et al., 5,118,192, shows a laser based 3D sensor system with internal mechanical means of rotating sensors to achieve favorable viewing conditions of irregular objects. The system utilizes multiple laser transmitters and detectors. The arrangement is optimized for viewing of objects like solder joints where occlusion and reflection artifacts are similar as illustrated in FIG. 5. The oblique illumination and viewing arrangement, together with a means of pivoting the sensor, allow a substantial fraction of the sloped sides of the solder joint to be viewed in such a manner that a high signal to noise—low spurious reflection condition—is achieved for typical surface orientation and conditions. However, several conditions can be found by ray tracing for which occlusion and reflection artifacts will be present within any single image. For demanding high speed applications, the time to acquire and process multiple viewpoints acquired through rotations and articulation is likely not available.

Other systems utilizing multiple triangulation-based detectors are disclosed in the U.S. Pat. No. to Hata, 4,731,853, which uses CCD detectors, and in the article by Kooijman, K., Horijon, J., (Philips) "Video Rate Laser Scanner: Considerations on Triangulation, Optics, Detectors, and Processing Circuits", Proc. SPIE, Vol. 2065, D. Svetkoff ed., September 1993, p. 253, Sec. 2, Triangulation Optics.

SUMMARY OF THE INVENTION

An object of the present invention is to provide a triangulation-based 3D imaging and processing method and system including filtering and estimation techniques for 3D imaging so to reduce the measurement errors sensed along the depth position sensitive axis of measurement, hence substantially improving the overall performance of high speed, laser scanned systems.

Another object of the present invention is to provide a triangulation-based 3D imaging and processing method and system which use information about object structure as seen by differences in measured height and gray scale data, and provide a knowledge-based multi-channel signal processing approach which either estimates (through weighted average of multiple sensor data) or filters each 3D data value for maximum contrast depending upon the confidence level of the information.

Yet another object of the present invention is to provide a triangulation-based 3D imaging and processing method and system which use a high speed laser scanning system to scan or project a single line of laser light and receive light with exactly two detectors, yet produce a much higher overall speed-accuracy figure of merit than slower mechanically scanned point measurement device which use a plurality (2 or more) of detectors or additional detector/transmitter pairs, hence, maximizing potential utilization.

Yet another object of the present invention is to provide a triangulation-based 3D imaging and processing method and system which operate in real time robustly and independent of special programming requirements (user intervention and placement of window) which could degrade measurement speed, yet allow for sufficient programming and threshold selection so as to optimize filtering and estimation for different imaging and measurement applications.

Yet another object of the present invention is to provide a triangulation-based 3D imaging and processing method and system which improve the dynamic range by limiting required use of but not excluding real time light modulation devices (direct laser modulation, Acousto-optic, etc.) which are used to compress or otherwise limit signals into electronic range, recognizing that overload in one channel need not be an overload in another, and that the largest of two signals may not be the most desirable.

Yet another object of the present invention is to provide a triangulation-based 3D imaging and processing method and system which, in turn, provides linear and non-linear pointwise filtering methods for defect enhancement and texture analysis to enhance surface microstructure rather than "average out" the detail as done with the prior art.

Yet still another object of the present invention is to provide a triangulation-based 3D imaging and processing method and system which weight pixels based upon confidence as determined by a relative match of gray scale and height data, and select transforms based upon the relative match.

Yet a further object of the present invention is to provide a triangulation-based 3D imaging and processing method and system which include a knowledge based 3D sensor which produces a confidence measure which can be used to determine data validity, or by means of computer control, control of manipulator so as to provide feedback for an articulator if so desired.

In carrying out the above objects and other objects of the present invention, a triangulation-based 3D processing method for generating transformed height and gray scale values is provided. The method includes the steps of generating a first pair of data values represented by height data and intensity data obtained from a first direction with respect to an object and generating a second pair of data values represented by height data and intensity data obtained from a second direction with respect to the object. The method also includes the steps of controllably selecting at least one control algorithm adapted to process the height and intensity data, processing the intensity data from the first and second directions to obtain transformed intensity data and processing the height data from the first and second directions and the intensity data from the first and second directions with the at least one control algorithm to obtain transformed height data. Finally, the method includes the step of transmitting the transformed height and intensity data which are adapted to be processed by an image processing computer. The transformed height data represents at least one transformed height value and the transformed intensity data represents at least one transformed gray scale value.

Still further in carrying out the above objects and other objects of the present invention, a triangulation-based 3D imaging and processing method for generating transformed height and gray scale values regarding an object located at an inspection station is provided. The method includes the steps of positioning the object at the inspection station, transmitting a beam of controlled radiant energy to a surface of the object to obtain first and second reflected beams of radiant energy and receiving and focusing the first reflected beam to obtain a first focused spot of radiant energy at a first imaging area and receiving and focusing the second reflected beam to obtain a second focused spot of radiant energy at a second imaging area. The method also includes the steps of detecting the position and intensity of the first focused spot of radiant energy at the first imaging area to provide a first signal, processing the first signal to generate a first set of height data and a first set of intensity data, detecting the position and intensity of the second focused spot of radiant energy at the second imaging area to provide a second signal and processing the second signal to generate a second set of height data and a second set of intensity data. The method further includes the steps of controllably selecting at least one control algorithm adapted to process the sets of height and intensity data, processing the first and second sets of intensity data to obtain a transformed set of intensity data and processing the first and second sets of height data and the first and second sets of intensity data with the at least one control algorithm to obtain a transformed set of height data. Finally, the method includes the step of transmitting the transformed sets of height and intensity data which are adapted to be processed by an image processing computer. The transformed set of intensity data represents at least one transformed gray scale value and the transformed set of height data represents at least one transformed height value.

Further in carrying out the above objects and other objects of the present invention, a system is provided for carrying out each of the above method steps of the above methods.

The method and system of the invention generally relates to three dimensional imaging and measurement using the principle of triangulation, and specifically relates to the use of laser scanning systems for high speed imaging, in which multiple detection systems are incorporated for improved accuracy through reduction of the effects of occlusion and spurious reflections. The invention relates to a new and useful filtering and estimation technique for gray scale and height data acquired by a laser scanning or structured light sensor where each point in the scene is viewed by exactly two sensors positioned on either side of the scan line or projected line of light. The method allows for reduction or elimination of errors which otherwise limit the achievable figure of merit of laser scanned systems when compared to much slower point laser triangulation systems incorporating additional detectors.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 6:
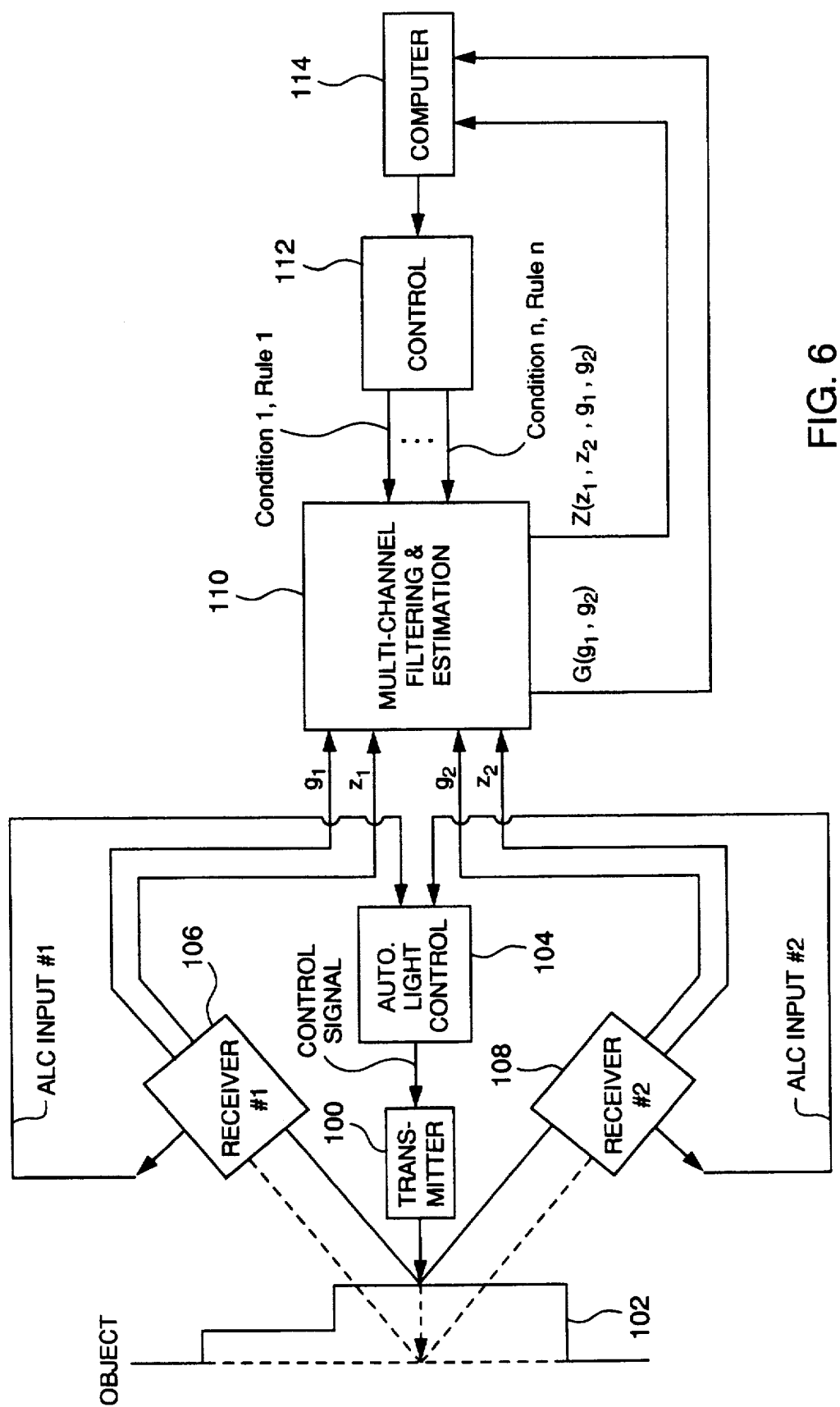
FIG. 6 is a schematic view of a dual sensor triangulation-based imaging system constructed in accordance with the present invention and having general numerical and logical data filtering.

Referring now to the drawing figures, there is illustrated in FIG. 6 a triangulation-based imaging and processing system constructed in accordance with the present invention.

The system includes a laser transmitter 100 which generally includes laser beam generator and electronic modulation mechanism for laser intensity control, beam deflector for scanning the laser beam or projecting a line of laser light, and optical focusing means to create a plurality of scanned points or a projected line of light across an object 102.

More specifically, the laser is typically a CLASS III-B laser diode such as the Sharp LT015-MD with wavelength typically in the range of 780 nm–830 nm and with maximum power below 50 mw. Advances in semiconductor laser diode technology may allow for shorter wavelengths (680 nm) which has a primary advantage of alleviating requirements for enclosures and interlocks.

Real time intensity modulation by an autolight control 104 is an option for very wide dynamic range imaging, where the directional reflectance varies by more than about 3 decades. The modulation of the laser diode may be direct, but reduction by more than about one decade below the rated power produces undesirable spatial and temporal modes which can introduce spatial noise, particularly in diffractive scanning systems, but also in a classical systems using a polygon, galvanometer, or resonant device.

The preferred means of modulation is with the use of an acousto-optic modulator with a beveled structure optimized for minimal delay such as 50 ns delay. The control range offered with such a modulator is much larger than what is achievable with direct laser modulation, exceeding 2 decades of additional range. The preferable method is to "ramp up" the light level and monitor the return with auxiliary amplifying detectors. The detectors of choice are avalanche photodiodes, preferably devices with 5 mm or larger diameter supplied by Advanced Photonix Corporation and having combiner amplifier/detector rise times of 25 NS or less.

As the method of the present invention acquires data by scanning or projecting a plurality of points (usually 512, but in the typical range of 64 to 1024, but not excluding longer scans or projection), a means of scanning or projecting a laser beam is needed. The preferable system previously described in the U.S. Pat. No. to Svetkoff et al., 5,024,529, uses a solid state acousto-optic deflector to produce a high speed flying laser spot with a telocentric optical system. Other means of high speed scanning include polygon laser scanners, resonant devices and hologons which are mechanical defection units are less desirable. Also, projection of lines of light with the use of high speed cameras for faster readout than the typical 15K points per second can be used, but not for quasi-video rate, full field applications.

The system of the present invention also generally includes first and second substantially identical sensors or receivers 106 and 108 which view off-axis. Each of the receivers 106 and 108 includes an optical delivery and focusing system and a detector having a position sensitive axis for determination of height by position detection and triangulation principle and for determination of received laser beam intensity. Optimally, each of the receivers 106 and 108 also includes a high speed amplifying detector (limiter) for laser intensity control, where a small fraction of the received light is split and delivered to the detector which preferably includes an avalanche photodiode and its associated pre-amplifier.

Means for focusing the first and second beams includes a pair of anamorphic magnification and field lens systems wherein each of the focused spots of radiant energy is an enlarged spot of radiant energy is an enlarged spot of radiant energy.

In particular, in the system of FIG. 6, there is symmetry only about the long axis of the scanned and projected beam, resulting in exactly two nearly identical optical arrangements for delivery of light to the detectors each of which has a position sensing axis. Various optical and electronic position sensitive detectors can be used depending upon speed and sensitivity requirements, but lateral effect photodiodes are now available which can provide high speed capability (up to video rates) with good performance provided that the dynamic range requirement is not extremely large (i.e. very low level signals). For the two detector system of FIG. 6, good matching is required along with capability for calibration updates via hardware look-up tables.

A best implementation of the previously mentioned intensity control method will be determined by a combination of the received signals from each of the two detectors.

Figure 1:
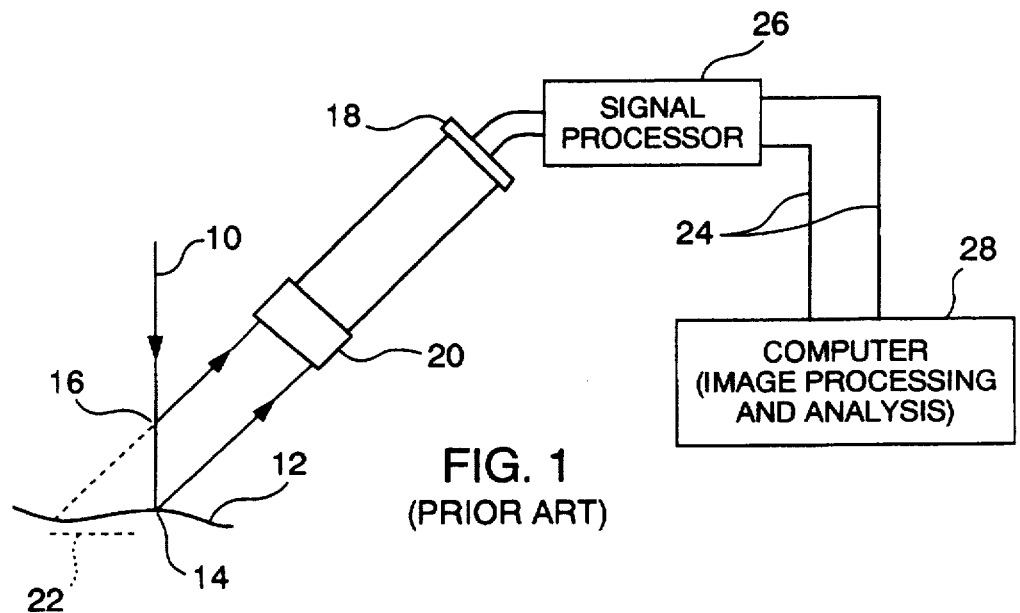
FIG. 1 is a schematic view of a basic triangulation-based system including a telocentric receiver with a single detector.
Figure 2:
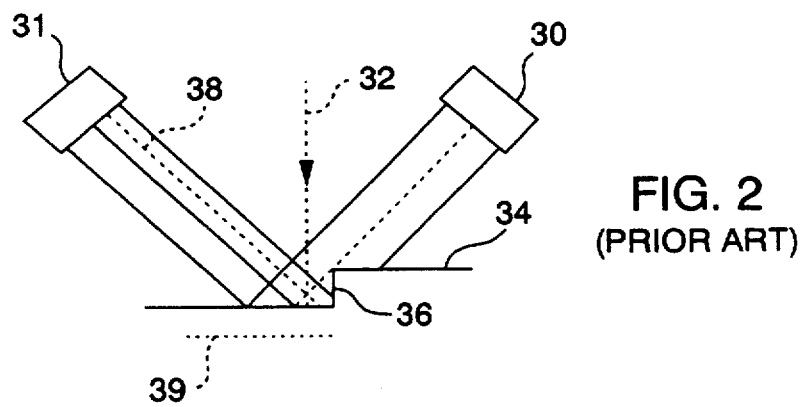
FIG. 2 is a schematic view of a triangulation-based dual receiver system which reduces shadow by using at least two receiver and detector subsystems.
Figure 3:
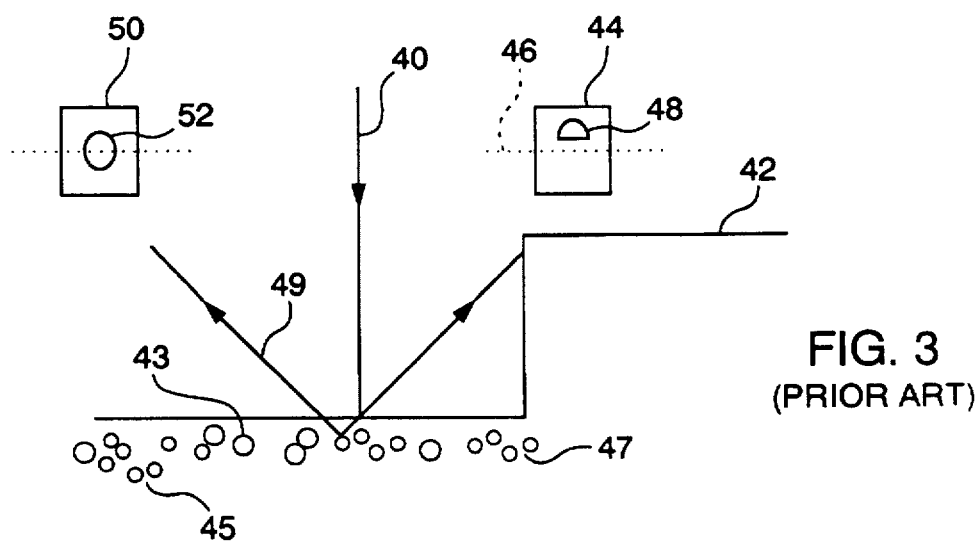
FIG. 3 is a schematic view of a triangulation-based dual receiver system wherein the combined effect of occlusion and bulk internal scattering creates asymmetric spot distributions at each detector which are not cancelled by averaging sensor channels.
Figure 4:
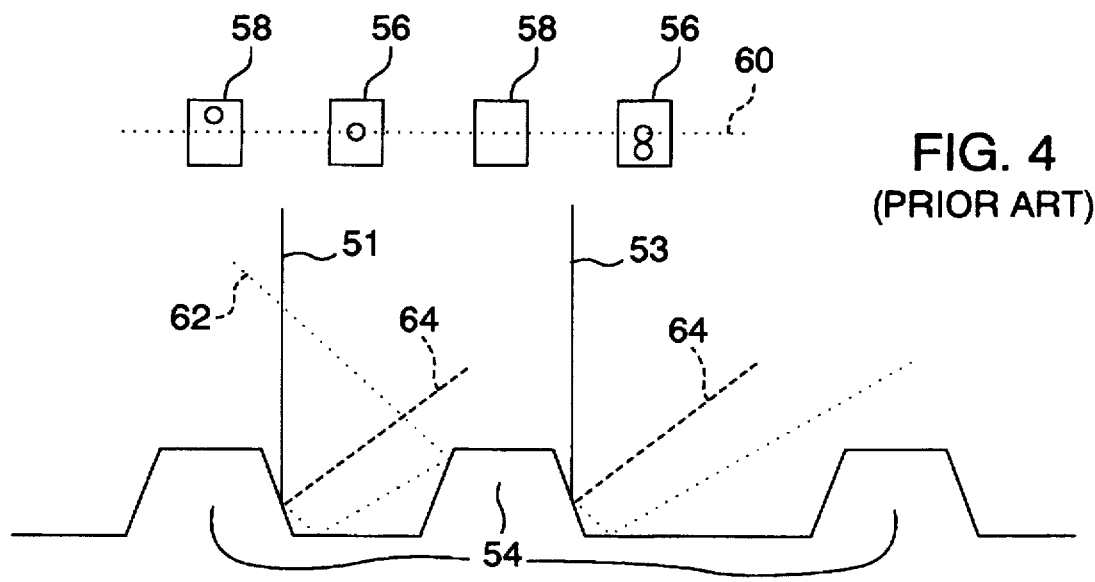
FIG. 4 is a schematic view of a triangulation-based dual receiver system utilizing triangulation, wherein the errors caused by secondary reflection are a complex function of surface geometry, reflectance, and background characteristics, including object proximity.
Figure 5:
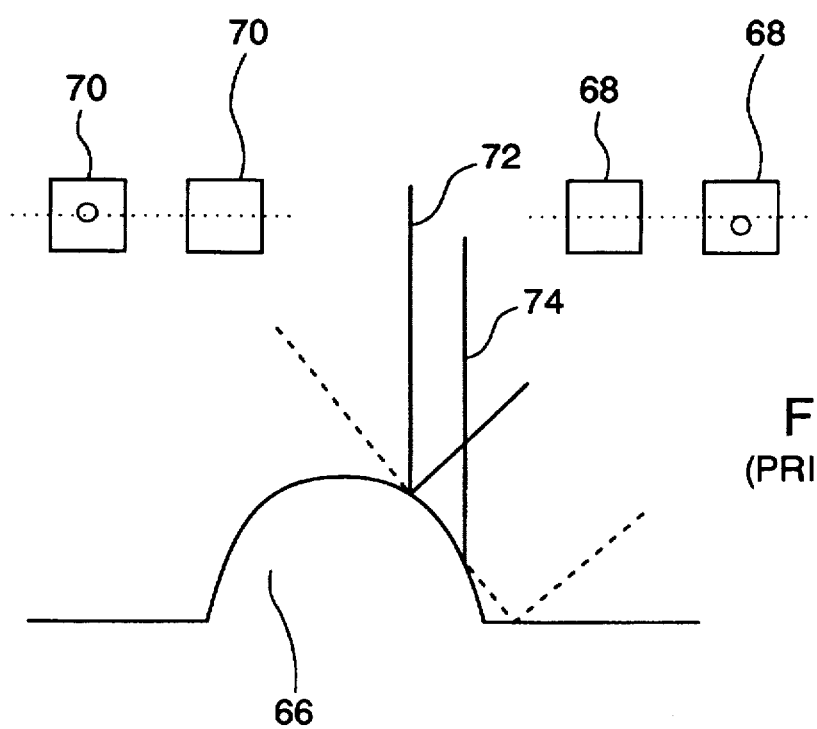
FIG. 5 is a schematic view of a triangulation-based dual receiver system wherein shiny spherical shaped surfaces present a problem with large localized reflectance changes (dynamic range) compounded with background reflection which may exceed signal from point interest.

FIG. 5 best illustrates the point where the capability of the detector 70 is sacrificed. Laser intensity control for enhancing the electronic dynamic range is not independent of the optical dynamic range and the effects of optical crosstalk resulting from a finite point spread function.

In general, the automatic light control 104 is electronic and has inputs derived from the amplifying detectors previously mentioned. The light control 104 produces an output voltage to control the modulator of the transmitter 100 based upon a predetermined function of both channels, (i.e. set light output such that Max(g1,g2)<V maximum and Min (g1,g2)>V minimum where V maximum and V minimum correspond to upper and lower useful limits of position sensor dynamic range) so that, whenever possible, neither channel exceeds a predetermined maximum intensity value set by the maximum useful dynamic range of the position detector, but both channels exceed a lower threshold, thereby maintaining a valid data condition.

Also, in general, each of the receivers 106 and 108 includes signal processing means or circuit which produces a digital height value representing the centroid of the spot intensity distribution on the detector, and to produce digital gray scale from integrated distribution or peak intensity value.

Each position detector require such a signal processing means for compressing wide dynamic range signals into a somewhat limited (typically 10–12 bits at high speed) A-D converter. A switched gain amplifier system is preferred, where each gain (or compression) stage is activated based upon a comparison with a signal threshold. This allows for good linearity, easy calibration, and good stability with temperature. DC restoration circuitry is used (sometimes called correlated double sampling) to compensate for offset drift, but more important, to cancel position dependent errors arising from charge storage and leakage from high signal values to lower ones. If the correction is applied to each pixel, substantial reduction in image smear occurs. Other means of signal processing include log ratio circuits which simplify the ratiometric processing to a simple subtraction operation.

After digitization of the gray scale and height information, the multiple sensor signals must be combined in some way to produce a good estimate of the height value at any given point, along with improving gray scale contrast in the presence of corrupting reflection noise described earlier wherein it was shown that linear estimation (average or sum) of values is too simple for complex scenes where occlusion and reflection problems are present. Furthermore, the averaging (or sums) limit the capability for study of surface texture when the scanned laser spot size is approximately the size of the surface marks, in some cases it is desirable to enhance these features, rather than average.

Figure 7:
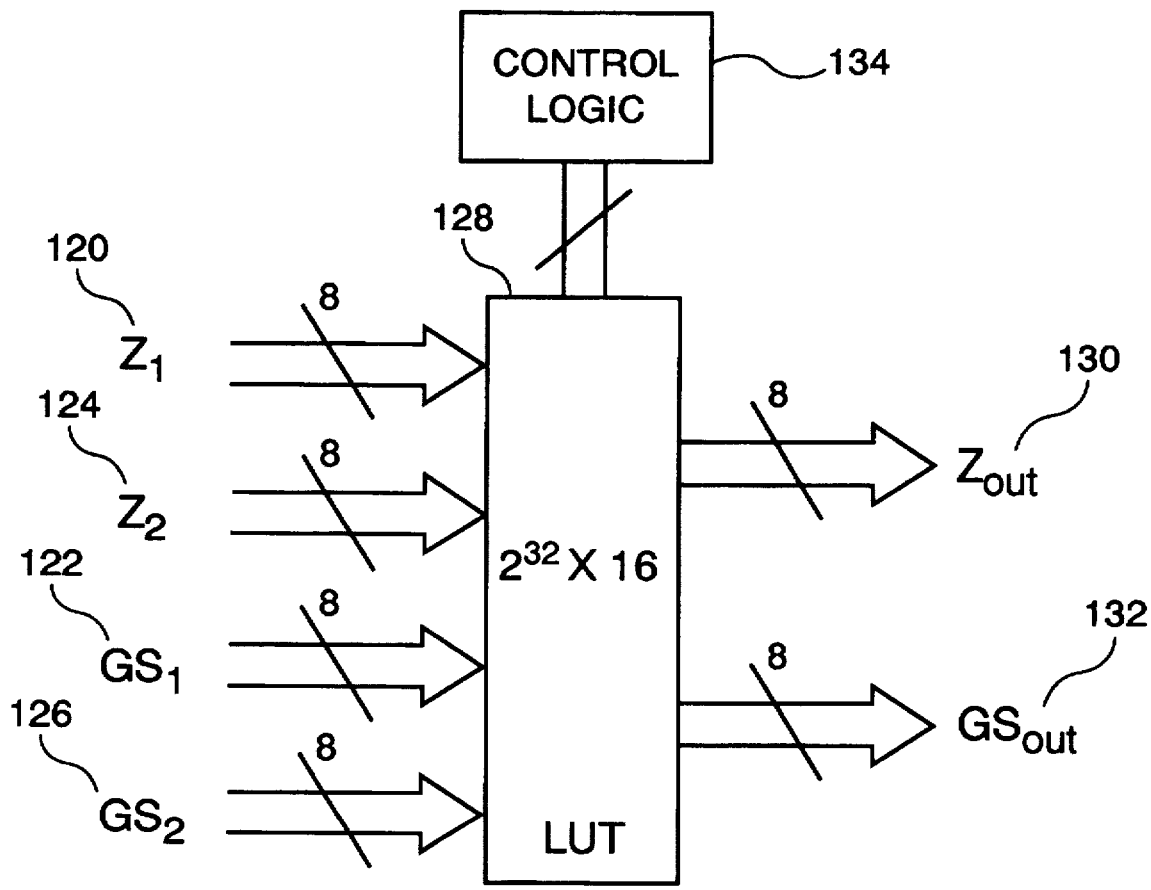
FIG. 7 is a schematic block diagram of basic circuitry used to combine the multiple sensor signals.

Hence, it is appropriate to employ conditional decision logic in which to select a series of alternative linear or non-linear transformations based upon the confidence of the sensor data, knowledge of scene reflectance of transmission characteristics, or the overall measurement goal. The function accomplished is both a filter and an estimator as illustrated in FIG. 6 as a multi-channel filtering and estimation block 110. A controller 112 controls selected logic or numeric function via programmed inputs from a host computer 114. FIG. 7 shows a specific embodiment which provides for implementation of a large number of numerical and combinational logic functions.

FIG. 7 illustrates a general implementation of combining logic for providing filtering and estimation of the 3D (i.e. z1, z2) and gray scale, $gs_1$, $gs_2$, information. This implementation shows the input and output data to be 8 bits of resolution, however this implementation can apply to any number of bits for the inputs or outputs. Inputs 120 (z1) and 122 ($gs_1$) are the 3D and gray scale information from the first receiver 106, and inputs 124 (z2) and 126 ($gs_2$) are the 3D and gray scale information from the second receiver 108. A look-up table 128 contains enough memory access for a one-to-one correspondence for every input combination to provide a desired output for the Z data 130 and the gray scale data 132. This logic can be used to correct various errors that may exist in the system, such as scale and offset errors between the two sensors, or known offsets in the 3D information based upon the gray scale value, as well as provide the proper decision rules to create the desired output for a particular application.

Control logic 134 is used to load the desired decision rule into the look-up table memory, as well as provide quick modifications of the current decision rules based on calibrations, or to select pre-load decision rules with little impact on processing time.

This general implementation provides full functional encoding of the 3D and gray scale outputs based upon the 3D and gray scale inputs from both receivers. However, at this time, the amount of memory needed may be cost prohibitive for the application it must support. Several variations of this implementation exist that can provide the desired functionality with minimum memory requirements.

Figure 8:
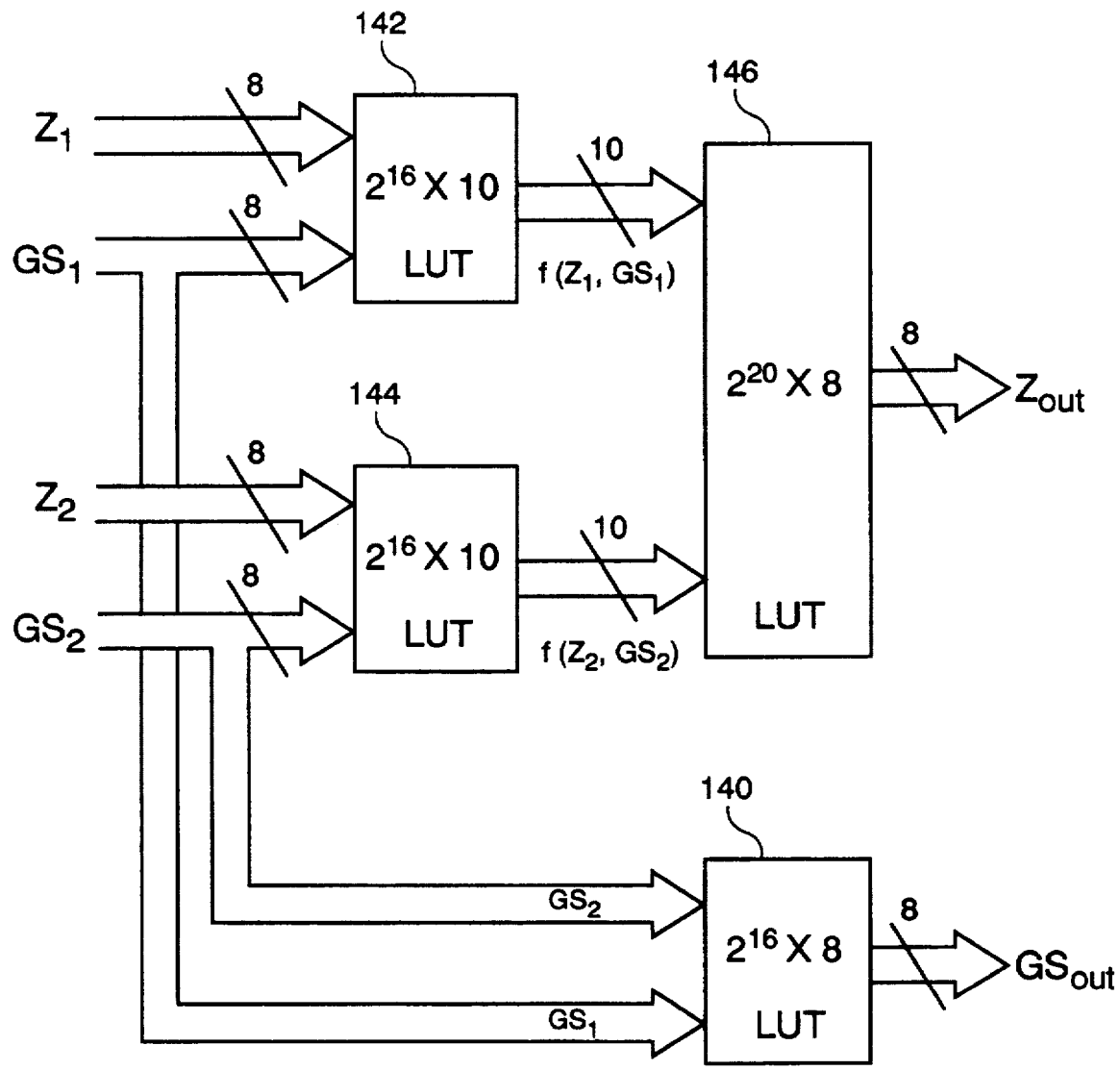
FIG. 8 is a schematic block diagram of more specific circuitry used to combine the multiple sensor signals and having a smaller memory requirement than the circuitry of FIG. 7.

FIG. 8 shows the preferred embodiment with a much smaller memory requirement than the embodiment of FIG. 7. For most applications, modification of the gray scale signal need not depend upon the calculated 3D values, therefore a look-up table 140 provides a gray scale output only dependent upon the two gray scale inputs. The output of the look-up table 140 can be the result from either receiver only, or a linear or non-linear estimate based upon both channels, such as an average, maximum, or maximum value from each channel.

Gray scale-to-Z look-up tables 142 and 144 provide full gray scale to 3D transformation for each channel respectively. In addition, this implementation shows two additional bits which may be used to encode additional information about the gray scale-to-Z relationship, such as gray scale thresholding, which can be passed on to a decision rule look-up table 146. For example, if the first receiver 106 has a gray scale value less than or greater than a pre-set threshold, then the decision rule should select the 3D value from the second receiver 108. The number of extra bits passed on from the gray scale-to-Z look-up tables 142 and 144 are shown as two bits, providing up to 4 tests that can be applied in the Decision Rule look-up table 146. However, any number of bits could be used.

Figure 9:
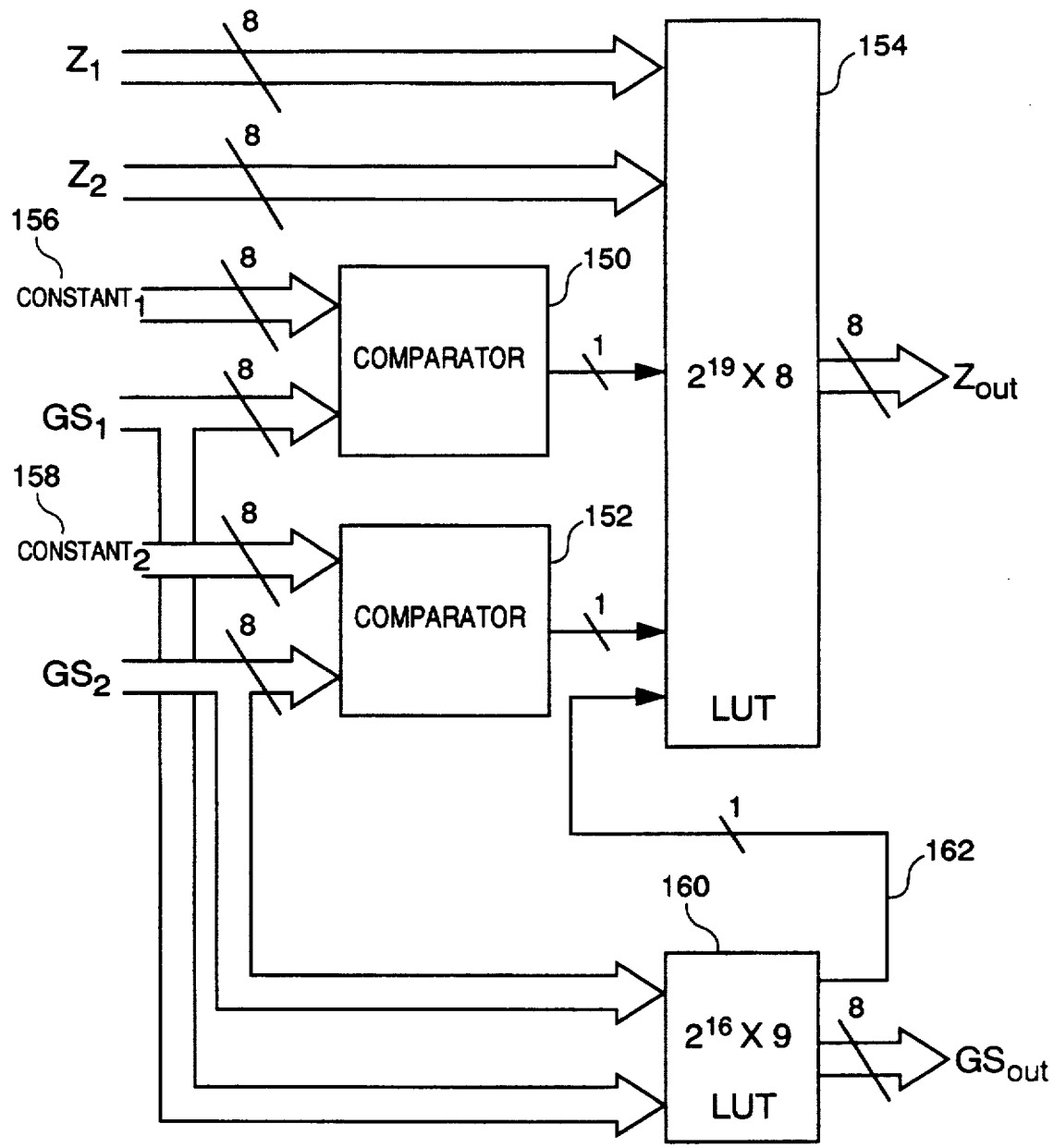
FIG. 9 is a schematic block diagram of other specific circuitry used to combine the multiple sensor signals and having even a smaller memory requirement that the circuitry of FIG. 8.

FIG. 9 shows an alternate embodiment with even less of a memory requirement than the embodiment of FIG. 8. The gray scale-to-Z look-up tables 142 and 144 of FIG. 8 are replaced with comparators 150 and 152, which can provide information to a Decision Rule look-up table 154 after comparing the gray scale data from the first and second receivers 106 and 108 with known constant values on buses 156 and 158. This implementation may be preferred if full gray scale-to-3D transformations are not necessary.

A gray scale-to-gray scale look-up table 160 can also generate an informational bit 162 connected to the Decision Rule look-up table 154, such as which of the two receivers 106 and 108 is providing the maximum gray scale value. Although this implementation shows one comparator per gray scale channel, multiple comparators could be used to provide multiple threshold data values, including the specifying of a range of gray scale values to select the proper Z decision rule. The memory requirement of each of the implementations of FIGS. 8 and 9 can also be further reduced if the gray scale to gray scale transformation is not needed by replacing the look-up table (140 or 160) with a switch (not shown) to continuously provide the gray scale information from either the first receiver 106 or the second receiver 108.

The logic providing the gray scale and 3D information may have specifically encoded values in the data that may signify that the gray scale intensity is too high or too low to provide accurate 3D information, or that the 3D information is out of range. In all of the described implementations (i.e. of FIGS. 6–9), the transformation tables can pass the special encoded values unchanged to the downstream logic, or even make special decisions based upon the appearance of the special values in one or more channels. Spatial filtering such as a median filter can be used later to "fill-in" the special encoded values based upon the data which can be inferred from the surrounding pixels.

In general, the combiner of FIG. 7 is digital and preprocesses dual channels of 3D and gray scale information or data to provide estimation and filtering of gray scale and 3D data prior to computer image analysis. The following typical functions are performed at block 110:

a) comparing digitized gray scale values g1 and g2 and comparing g1 and g2 with programmable thresholds indicating selected upper and lower limits of dynamic range (this range may be the entire sensor dynamic range or a narrower range of pre-programmed values, i.e. as narrow as about 3:1 but as wide as $10^5 - 10^6$;

b) encoding the data point with a special value if both g1 and g2 are not within specified limits;

c) comparing the difference in recorded height values (z1-z2) with a preprogrammed match tolerance if values g1 and g2 are within the selected lower and upper limits of dynamic range;

d) selecting at least one logic or numeric function based upon result of comparison of height values z1 and z2 and with a predetermined match tolerance, and comparison of gray scale values g1 and g2 with preprogrammed thresholds;

e) transforming height values z1 and z2 to a new height value Z based upon a comparison with a matching threshold and values of gray scale g1 and g2 with predetermined thresholds, the transformation to include any or all of the following:

i. weight linear (or affine) transformations of height values to provide a best estimate of Z when z1 and z2 are within the match tolerance and gray scale values g1 and g2 are both within a preprogrammed range, ii. non-linear order statistics (i.e. minimum or maximum) when data exceeds a larger tolerance, or for contrast improvement if best estimate Z is not required but mismatch is within the tolerance, iii. special codes indicating an invalid data condition when the mismatch exceeds a specified tolerance, a very important operation, iv. selecting either z1 (or z2) if gray scale value g2 (or g1) is outside programmed limit of dynamic range but other channel is within the limit, f) transforming gray scale values g1 and g2 to a new gray scale value G based upon a comparison of a matching threshold with a specified linear or nonlinear transformation, and to include both weighted linear transformations of gray values when z1 and z2 are within the match tolerance, and non-linear order statistics (i.e. minimum or maximum) when data exceeds a larger tolerance, or other special codes when the mismatch exceeds specified tolerance hence indicating an invalid gray scale data condition;

g) storing at least one transformed gray scale value G (g1,g2) for every single sample point of the object; and h) storing at least one transformed height value Z (z1, z2, g1, g2) for every single sample point on the object.

Experimental results with the imaging system based upon the conditional decision rules of FIG. 8 have shown reduction in error from an unacceptable 30% to 50% level to 5% typical using the 90 degree rotation test. The performance is within typical customer solder paste specifications. Furthermore, image quality for inspection of microscopic bumps and BGA technology was improved, allowing coplanarity measurements on miniature solder balls having 40 micron diameter. Reproducibility of 1 micron was found for the coplanarity measurement using the above-noted dual detector3D sensor with 5 micron lateral resolution (8 samples across solder ball) and 0.6 micron resolution in depth. Further improvements are anticipated with minor modifications of the decision rules. Improved estimates of ball diameter were also obtained using the minimum of gray scale values from the channels for contrast improvement.

Advancements in digital computer architectures and reduced cost of memory and high speed arithmetic and logic units will result in changes in the implementation by substitution of new and faster components, miniaturization, and alteration of the sequence in which some operations are performed. Specific modifications well known to those skilled in the art include methods for reduction of the imaging head size, electronic designs allowing for incorporation of signal processing functions within the imaging head, reduction in the memory required within the multi-channel processor with alternative use of high speed arithmetic and logic units, storage components for additional images to allow several functions to be performed on the input image thus producing multiple output images, etc.

However, the key elements of the invention, which pertain to the selection of logical and numerical operations based upon confidence of the 3D and gray scale data and the knowledge of the underlying physics, result in a significant advancement over the prior art, particularly the systems which average the two sensor channels.

While the best mode for carrying out the invention has been described in detail, those familiar with the art to which this invention relates will recognize various alternative designs and embodiments for practicing the invention as defined by the following claims.

What is claimed is:

1. A triangulation-based 3D processing method for generating transformed height and gray scale values, the method comprising the steps of:

generating a first pair of data values represented by height data and intensity data obtained from a first direction with respect to an object;

generating a second pair of data values represented by height data and intensity data obtained from a second direction with respect to the object;

controllably selecting at least one control algorithm adapted to process the height and intensity data;

processing the intensity data from the first and second directions to obtain transformed intensity data;

processing the height data from the first and second directions and the intensity data from the first and second directions with the at least one control algorithm to obtain transformed height data; and transmitting the transformed height and intensity data which are adapted to be processed by an image processing computer, the transformed height data representing at least one transformed height value and the transformed intensity data representing at least one transformed gray scale value.

2. A triangulation-based 3D imaging and processing method for generating transformed height and gray scale values regarding an object located at an inspection station, the method comprising the steps of:

positioning the object at the inspection station;

transmitting a beam of controlled radiant energy to a surface of the object to obtain first and second reflected beams of radiant energy;

receiving and focusing the first reflected beam to obtain a first focused spot of radiant energy at a first imaging area and receiving and focusing the second reflected beam to obtain a second focused spot of radiant energy at a second imaging area;

detecting the position and intensity of the first focused spot of radiant energy at the first imaging area to provide a first signal;

processing the first signal to generate a first set of height data and a first set of intensity data;

detecting the position and intensity of the second focused spot of radiant energy at the second imaging area to obtain a second signal;

processing the second signal to generate a second set of height data and a second set of intensity data;

controllably selecting at least one control algorithm adapted to process the sets of height and intensity data;

processing the first and second sets of intensity data to obtain a transformed set of intensity data;

processing the first and second sets of height data and the first and second sets of intensity data with the at least one control algorithm to obtain a transformed set of height data; and transmitting the transformed sets of height and intensity data which are adapted to be processed by an image processing computer, the transformed set of intensity data representing at least one transformed gray scale value and the transformed set of height data representing at least one transformed height value.

3. The method as claimed in claim 2 wherein the step of transmitting a beam of controlled radiant energy includes the step of scanning the beam and wherein the beam of controlled radiant energy is a modulated beam of coherent light.

4. The method as claimed in claim 2 further comprising the steps of generating first and second feedback signals based on the first and second reflected beams, respectively, and utilizing the first and second feedback signals to control the intensity of the beam of controlled radiant energy.

5. The method as claimed in claim 2 wherein the step of focusing the first and second beams is accomplished with a pair of anamorphic magnification and field lens systems wherein each of the focused spots of radiant energy is an enlarged elongated spot of radiant energy.

6. The method as claimed in claim 5 wherein the steps of detecting the positions of the first and second focused spots of radiant energy are accomplished by a pair of small area position detectors, each of the position detectors having a position-sensitive axis for determination of height by position detection and triangulation and is capable of determining intensity of its respective focused spot of radiant energy.

7. The method as claimed in claim 2 wherein the transformed height and gray scale values represent a gray scale digital image containing the object.

8. The method as claimed in claim 2 wherein the step of transmitting includes the step of projecting or scanning the beam to create a plurality of points in the form of a line focused onto the object.

9. The method as claimed in claim 6 wherein each of the position detectors is a lateral effect photodiode or a detector array.

10. The method as claimed in claim 4 wherein the step of generating the first and second feedback signals includes the step of splitting the first and second reflected beams to obtain first and second split portions and detecting the first and second split portions to obtain the first and second feedback signals.

11. The method of claim 10 wherein the step of detecting the first and second split portions is accomplished with a pair of amplifying avalanche photodiodes.

12. The method as claimed in claim 6 wherein the step of processing the first signal includes the step of creating a first height value representing a centroid of the intensity distribution of the first focused spot and wherein the step of processing the second signal includes the step of creating a second height value representing a centroid of the intensity distribution of the second focused spot.

13. The method as claimed in claim 2 wherein the step of processing the first and second sets of intensity data includes the steps of comparing values represented by the first and second sets of intensity data with each other and determining whether the values represented by the first and second sets of intensity data are within a preprogrammed dynamic range.

14. The method of claim 13 wherein the preprogrammed dynamic range has upper and lower limits wherein the upper limit is as small as three times larger than the lower limit.

15. The method of claim 13 wherein the preprogrammed dynamic range has upper and lower limits wherein the upper limit is up to $10^6$ times larger than the lower limit.

16. The method as claimed in claim 13 wherein the step of processing the first and second sets of intensity data includes the step of encoding each datum of the transformed set of intensity data with a predetermined value if the values represented by the first and second sets of intensity data are both outside the preprogrammed dynamic range.

17. The method as claimed in claim 13 wherein the step of processing the first and second sets of height data includes the step of determining the mathematical difference between corresponding values represented by the first and second sets of height data and, if the values represented by the first and second sets of intensity data are inside the preprogrammed dynamic range, comparing the mathematical difference to a predetermined match tolerance.

18. The method as claimed in claim 2 wherein the step of processing the first and second sets of intensity data includes the steps of determining if a first data value is outside a predetermined range and a second data value is inside the predetermined range and selecting the second data value as a valid value.

19. The method as claimed in claim 17 further including the step of selecting a predetermined function based on the step of comparing the mathematical difference with the predetermined match tolerance.

20. The method as claimed in claim 19 wherein the function is a logical function including the minimum or maximum of the height and gray scale values.

21. The method as claimed in claim 19 wherein the function is a numeric function including the average value or difference of the height and gray scale values.

22. A triangulation-based 3D processing system for generating transformed height and gray scale values, the system comprising:

means for generating a first pair of data values represented by height data and intensity data obtained from a first direction with respect to an object;

means for generating a second pair of data values represented by height data and intensity data obtained from a second direction with respect to the object;

means for controllably selecting at least one control algorithm adapted to process the height and intensity data;

means for processing the intensity data from the first and second directions to obtain transformed intensity data;

means for processing the height data from the first and second directions and the intensity data from the first and second directions with the at least one control algorithm to obtain transformed height data; and means for transmitting the transformed height and intensity data which are adapted to be processed by an image processing computer, the transformed height data representing at least one transformed height value and the transformed intensity data representing at least one transformed gray scale value.

23. A triangulation-based 3D imaging and processing system for generating transformed height and gray scale values regarding an object located at an inspection station, the system comprising:

means for transmitting a beam of controlled radiant energy to a surface of the object to obtain first and second reflected beams of radiant energy;

means for receiving and focusing the first reflected beam to obtain a first focused spot of radiant energy at a first imaging area and means for receiving and focusing the second reflected beam to obtain a second focused spot of radiant energy at a second imaging area;

means for detecting the position and intensity of the first focused spot of radiant energy at the first imaging area to provide a first signal;

means for processing the first signal to generate a first set of height data and a first set of intensity data;

means for detecting the position and intensity of the second focused spot of radiant energy at the second imaging area to provide a second signal;

means for processing the second signal to generate a second set of height data and a second set of intensity data;

means for selecting at least one control algorithm;

means for processing the first and second sets of intensity data to obtain a transformed set of intensity data;

means for processing the first and second sets of height data and the first and second sets of intensity data with the at least one control algorithm to obtain a transformed set of height data; and means for transmitting the transformed sets of height and intensity data which are adapted to be processed by an image processing computer, the transformed set of intensity data representing at least one transformed gray scale value and the transformed set of height data representing at least one transformed height value.

24. The system as claimed in claim 23 wherein the means for transmitting includes means for scanning the beam and wherein the beam of controlled radiant energy is a modulated beam of coherent light.

25. The system as claimed in claim 23 further comprising first and second feedback means for generating first and second feedback signals, respectively, based on the first and second reflected beams, respectively, and control means for utilizing the first and second feedback signals to control the intensity of the beam of controlled radiant energy.

26. The system as claimed in claim 23 wherein the means for focusing the first and second beams includes a pair of anamorphic magnification and field lens systems wherein each of the focused spots of radiant energy is an enlarged elongated spot of radiant energy.

27. The system as claimed in claim 26 wherein the means for detecting the positions of the first and second focused spots of radiant energy includes a pair of small area position detectors, wherein each of the position detectors has a position-sensitive axis for determination of height by position detection and triangulation and is capable of determining intensity of its respective focused spot of radiant energy.

28. The system as claimed in claim 23 wherein the transformed height and gray scale values represent a gray scale digital image containing the object.

29. The system as claimed in claim 23 wherein the means for transmitting a beam of controlled radiant energy includes means for projecting or scanning the beam to create a plurality of points in the form of a line focused onto the object.

30. The system as claimed in claim 27 wherein each of the position detectors is a lateral effect photodiode or a detector array.

31. The system as claimed in claim 25 wherein the means for generating the first and second feedback signals includes means for splitting the first and second reflected beams to obtain first and second split portions and means for detecting the first and second split portions to obtain the first and second feedback signals.

32. The system of claim 31 wherein the means for detecting includes a pair of amplifying avalanche photodiodes.

33. The system as claimed in claim 27 wherein the means for processing the first signal includes means for creating a first height value representing a centroid of the intensity distribution of the first focused spot and wherein the means for processing the second signal includes means for creating a second height value representing a centroid of the intensity distribution of the second focused spot.

* * * * *

UNITED STATES PATENT AND TRADEMARK OFFICE
CERTIFICATE OF CORRECTION

PATENT NO. : 5,546,189
DATED : August 13, 1996
INVENTOR(S) : Donald J. Svetkoff et al It is certified that error appears in the above-indentified patent and that said Letters Patent is hereby corrected as shown below:

Column 1, line 58 "641 x 641" should be --6" x 6"--;

Column 9, line 37 "that" should be --than--;

Column 10, line 11 "NS" should be --ns--; and

Column 10, lines 43 and 44, after the first occurrence of "energy" delete "is an enlarged spot of radiant energy".

UNITED STATES PATENT AND TRADEMARK OFFICE
CERTIFICATE OF CORRECTION

PATENT NO. : 5,546,189
DATED : August 13, 1996
INVENTOR(S) : Donald J. Svetkoff et al.

It is certified that error appears in the above-indentified patent and that said Letters Patent is hereby corrected as shown below:

On the title page: Item [75] under "Inventors" "Ronald J. Svetkoff" should be --Donald J. Svetkoff--;

Column 1, line 34 after "noise" insert --)--;

Column 1, line 47 "641 x 641" should be --6" x 6"--;

Column 1, line 51 "641 x 641" should be --6" x 6"--;

Signed and Sealed this

Fourth Day of March, 1997

Attest:

BRUCE LEHMAN

Attesting Officer

Commissioner of Patents and Trademarks